(12) United States Patent
Yoshioka

(10) Patent No.: US 10,142,691 B2
(45) Date of Patent: Nov. 27, 2018

(54) DISPLAY SYSTEM, DISPLAY APPARATUS, DISPLAY METHOD, AND PROGRAM

(71) Applicant: NEC CASIO COMMUNICATIONS, LTD., Kawasaki-shi, Kanagawa (JP)

(72) Inventor: Kenji Yoshioka, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/377,513

(22) PCT Filed: Feb. 19, 2013

(86) PCT No.: PCT/JP2013/054022
§ 371 (c)(1),
(2) Date: Aug. 8, 2014

(87) PCT Pub. No.: WO2013/133010
PCT Pub. Date: Sep. 12, 2013

(65) Prior Publication Data
US 2015/0033253 A1    Jan. 29, 2015

(30) Foreign Application Priority Data
Mar. 8, 2012    (JP) .................................. 2012-052237

(51) Int. Cl.
*H04N 21/462* (2011.01)
*H04N 5/445* (2011.01)
(Continued)

(52) U.S. Cl.
CPC ..... *H04N 21/4622* (2013.01); *H04N 5/44591* (2013.01); *H04N 21/25891* (2013.01);
(Continued)

(58) Field of Classification Search
CPC ............. H04N 5/44591; H04N 21/812; H04N 21/4788; H04N 21/8456; H04N 21/4113;
(Continued)

(56) References Cited

U.S. PATENT DOCUMENTS 7,543,322 B1 * 6/2009 Bhogal .............. H04N 5/44543
725/38
8,776,149 B1 * 7/2014 Koch ................. H04N 21/4334
725/37
(Continued)

FOREIGN PATENT DOCUMENTS

EP        2501144        9/2012
JP     2003-153105       5/2003
(Continued)

OTHER PUBLICATIONS

Extended European search report, dated Sep. 18, 2015; Application No. 13758375.3.
(Continued)

*Primary Examiner* — Chenea Smith
(74) *Attorney, Agent, or Firm* — Young & Thompson

(57) ABSTRACT

Currently delivered content data of contents are received and are each able to be output to an output unit. An estimated value for evaluating a posting status of posted information, that is posted on a Web page in association with the content, is computed. Based on the estimated value, it is determined whether or not a switching condition for switching a main content among the contents, that is being output to the output unit, to a sub-content among the contents, that is not being output to the output unit, is satisfied. If it is determined that the switching condition is satisfied, information utilized to switch the content is output to the output unit.

11 Claims, 12 Drawing Sheets

(51) Int. Cl.
    *H04N 21/472*        (2011.01)
    *H04N 21/4788*      (2011.01)
    *H04N 21/845*        (2011.01)
    *H04N 21/258*        (2011.01)
    *H04N 21/482*        (2011.01)
    *H04N 21/488*        (2011.01)
    *H04N 21/81*         (2011.01)
    *H04N 21/41*         (2011.01)
    *H04N 21/4782*      (2011.01)
    *H04N 21/442*        (2011.01)

(52) U.S. Cl.
    CPC ..... *H04N 21/4113* (2013.01); *H04N 21/4126* (2013.01); *H04N 21/44204* (2013.01); *H04N 21/4782* (2013.01); *H04N 21/4788* (2013.01); *H04N 21/47214* (2013.01); *H04N 21/47217* (2013.01); *H04N 21/482* (2013.01); *H04N 21/4826* (2013.01); *H04N 21/4882* (2013.01); *H04N 21/812* (2013.01); *H04N 21/8456* (2013.01)

(58) Field of Classification Search
    CPC ........... H04N 21/4126; H04N 21/4622; H04N 21/4782; H04N 21/44204; H04N 21/47214; H04N 21/4826; H04N 21/25891; H04N 21/482; H04N 21/4882; H04N 21/47217; H04N 21/44591; H04N 21/44024
    See application file for complete search history.

(56) References Cited

U.S. PATENT DOCUMENTS

| | | | |
|---|---|---|---|
| 2001/0049826 A1* | 12/2001 | Wilf | H04N 21/84 725/120 |
| 2002/0133506 A1 | 9/2002 | Yamato | |
| 2003/0159145 A1* | 8/2003 | Kaltz | H04N 7/163 725/46 |
| 2007/0266401 A1 | 11/2007 | Hallberg | |
| 2008/0271078 A1* | 10/2008 | Gossweiler | H04N 5/44543 725/40 |
| 2009/0113466 A1* | 4/2009 | Amitay | H04N 7/162 725/9 |
| 2011/0041080 A1* | 2/2011 | Fleischman | G06Q 30/02 715/751 |
| 2011/0271303 A1* | 11/2011 | Isozu | H04N 21/4126 725/40 |
| 2011/0288912 A1 | 11/2011 | McCrea et al. | |
| 2012/0054795 A1 | 3/2012 | Kang et al. | |
| 2013/0074109 A1* | 3/2013 | Skelton | H04H 20/00 725/14 |

FOREIGN PATENT DOCUMENTS

| | | |
|---|---|---|
| JP | 2003-199084 | 7/2003 |
| JP | 2005-347806 | 12/2005 |
| JP | 2007-116367 A | 5/2007 |
| JP | 2007-166363 | 6/2007 |
| JP | 2009-212630 | 9/2009 |
| JP | 2010-109792 | 5/2010 |
| JP | 2011-040858 | 2/2011 |
| JP | 2011-234198 | 11/2011 |
| JP | 2012-009957 | 1/2012 |

OTHER PUBLICATIONS

Japanese Office Action dated Jan. 24, 2017; Application No. 2014-503747.

International Search Report—PCT/JP2013/054022—dated Apr. 2, 2013.

* cited by examiner

FIG. 5

CONTENT BROADCAST INFORMATION TABLE (431)

| CONTENT ID | BROADCAST TIME PERIOD | CONTENT RELATED INFORMATION |
|---|---|---|
| 0001 | 2011.10.10.19:00-21:00 | Station A, baseball, Hanshin, Kyojin |
| 0002 | 2011.10.10.19:00-20:00 | Station B, song program |
| 0003 | 2011.10.10.19:00-20:00 | Station C, drama |
| 0004 | 2011.10.10.20:00-20:00 | Station D, cooking program |
| 0005 | 2011.10.10.20:00-21:00 | Station B |

FIG. 6
USER ATTRIBUTE INFORMATION TABLELE (432)

| POSTER ID | SEX | AGE | FAVORITE CATEGORY |
|---|---|---|---|
| 11111 | Male | 30s | baseball, comedy, song |
| 22222 | Male | 20s | song, drama |
| 33333 | Female | 10s | baseball, drama, anime |
| 44444 | Female | 20s | cooking, drama |
| 55555 | Female | 10s | baseball, comedy, anime |
| | | | |

FIG. 7
POSTED INFORMATION TABLE (433)

| POSTER ID | POSTING TIME | POSTED INFORMATION | CONTENT ID |
|---|---|---|---|
| 11111 | 2011.10.01.00:01 | ××××× | 0001 |
| 22222 | 2011.10.01.00:02 | ××××× | 0001 |
| ⋮ | ⋮ | ⋮ | ⋮ |
| 33333 | 2011.10.10.19:03 | ××××× | 0001 |
| 44444 | 2011.10.10.19:04 | ××××× | 0002 |
| 55555 | 2011.10.10.19:05 | ××××× | 0005 |
| 66666 | 2011.10.10.19:06 | ××××× | 0001 |
| 77777 | 2011.10.10.20:07 | ××××× | 0003 |
| | | | |

DISPLAY SYSTEM, DISPLAY APPARATUS, DISPLAY METHOD, AND PROGRAM

TECHNICAL FIELD

The present invention relates to a display system, a display apparatus, a display method, and a program.

BACKGROUND ART

Recently, portable terminals such as smartphones, tablet terminals, and the like have been popular. The portable terminals may have a function of receiving airwaves of television broadcasts or a function of accessing the Internet. A user of such a portable terminal can browse or watch TV or music contents.

Some portable terminals can retrieve a content, which is predicted based on user information (about a user), popularity information (about a degree of popularity), or the like, from among a plurality of contents such as broadcasted TV programs and provide the retrieved content to the user (e.g., see Patent Document 1).

Additionally, some portable terminals can divide contents of a program which is being broadcast through each channel into a plurality of chapters and compute a score for each chapter in accordance with a degree of activity (which increases by a home-run scene in a broadcast program of a baseball game or a goal scene in a broadcast program of a soccer game) obtained from the channel. Based on the computed scores, the most recommended chapter for the user is reproduced sequentially (e.g., see Patent Document 2).

Furthermore, some portable terminals can simultaneously display images of a main program and a sub-program. When the sub-program becomes lively, main output sound is switched from the sound of the main program to the sound of the sub-program (e.g., see Patent Document 3).

In addition, users post image or text data utilizing a social networking service such as a Twitter (registered trademark) or a Facebook (registered trademark) so as to share recent circumstances or present ideas on a Web page. When observing the state of posting the information posted as described above, it is possible to predict that when the state of posting is lively, the relevant TV program is popular and that when the state of posting is not lively, the relevant TV program has a low popularity.

PRIOR ART DOCUMENT

Patent Document

Patent Document 1: Japanese Unexamined Patent Application, First Publication No. 2003-199084.
Patent Document 2: Japanese Unexamined Patent Application, First Publication No. 2007-166363.
Patent Document 3: Japanese Unexamined Patent Application, First Publication No. 2010-109792.

DISCLOSURE OF INVENTION

Problem to be Solved by the Invention

However, it is very difficult for a user who watches the contents of a TV program or the like to simultaneously browse posted information and find a TV program that is trending.

An object of the present invention is to provide a display system, a display apparatus, a display method, and a program, that can solve the above-described problem.

Means for Solving the Problem

In order to solve the above-described problem, the present invention provides a display system comprising:
a communication unit that receives currently delivered content data of contents which are each able to be output to an output unit;
an estimated value computation unit that computes an estimated value for evaluating a posting status of posted information that is posted on a Web page in association with the content;
a determination unit that determines, based on the estimated value, whether or not a switching condition for switching a main content among said contents, that is being output to the output unit, to a sub-content among said contents, that is not being output to the output unit, is satisfied; and an output control unit that controls, if it is determined that the switching condition is satisfied, the output unit to output information utilized to switch the content.

The present invention also provides a display apparatus comprising:
a communication unit that receives currently delivered content data of contents which are each able to be output to an output unit;
an estimated value computation unit that computes an estimated value for evaluating a posting status of posted information that is posted on a Web page in association with the content;
a determination unit that determines, based on the estimated value, whether or not a switching condition for switching a main content among said contents, that is being output to the output unit, to a sub-content among said contents, that is not being output to the output unit, is satisfied; and
an output control unit that controls, if it is determined that the switching condition is satisfied, the output unit to output information utilized to switch the content.

The present invention also provides a display method comprising:
a step that receives currently delivered content data of contents which are each able to be output to an output unit;
a step that computes an estimated value for evaluating a posting status of posted information that is posted on a Web page in association with the content;
a step that determines, based on the estimated value, whether or not a switching condition for switching a main content among said contents, that is being output to the output unit, to a sub-content among said contents, that is not being output to the output unit, is satisfied; and
a step that controls, if it is determined that the switching condition is satisfied, the output unit to output information utilized to switch the content.

The present invention also provides a program that makes a computer function as:
a communication device that receives currently delivered content data of contents which are each able to be output to an output unit;
an estimated value computation device that computes an estimated value for evaluating a posting status of posted information that is posted on a Web page in association with the content;

a determination device that determines, based on the estimated value, whether or not a switching condition for switching a main content among said contents, that is being output to the output unit, to a sub-content among said contents, that is not being output to the output unit, is satisfied; and an output control device that controls, if it is determined that the switching condition is satisfied, the output unit to output information utilized to switch the content.

Effect of the Invention

In accordance with the present invention, an appropriate timing for switching the content output to an output unit can be easily known.

BRIEF DESCRIPTION OF THE DRAWINGS

FIG. 5 is a diagram showing an example of the structure of a content broadcast information table pertaining to the embodiment of the present invention.

FIG. 6 is a diagram showing an example of the structure of a user attribute information table pertaining to the embodiment of the present invention.

FIG. 7 is a diagram showing an example of the structure of a posted information table pertaining to the embodiment of the present invention.

MODE FOR CARRYING OUT THE INVENTION

First Embodiment

Figure 1:
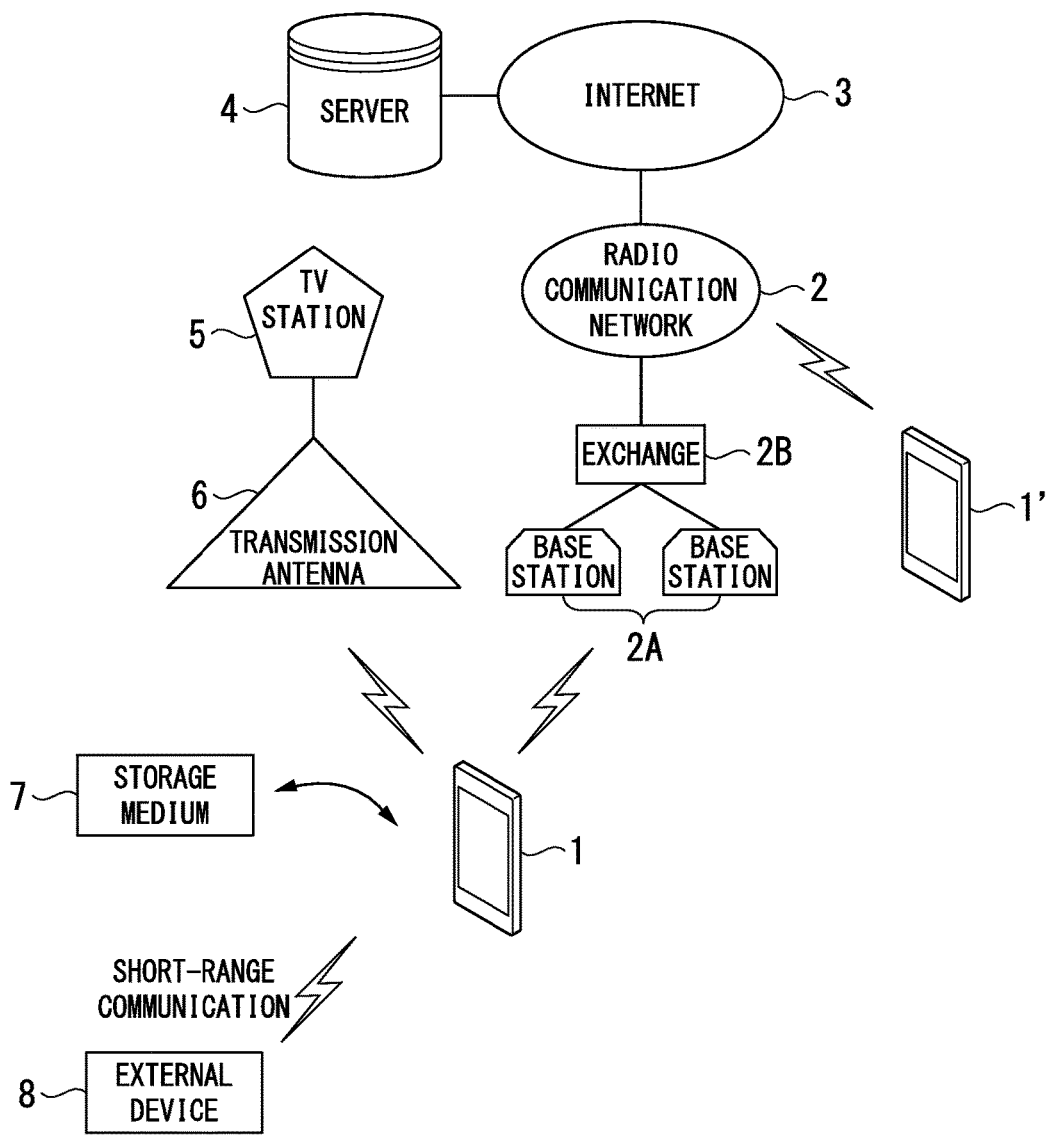
FIG. 1 is a diagram showing an example of the general formation of a display system pertaining to an embodiment of the present invention.

Below, an embodiment of the present invention will be explained in detail with reference to the drawings. FIG. 1 is a diagram showing a general formation of an information processing system pertaining to the embodiment of the present invention.

The present embodiment shows an example in which a portable terminal 1 is employed as an information processing apparatus pertaining to the present invention. FIG. 1 is a general diagram that shows a communication network system that the portable terminal 1 can use.

However, the present invention is not limited to the above formation and the information processing system may be a smartphone, a portable game machine, a PDA (Personal Digital Assistant), a tablet PC (Personal Computer), or a notebook PC.

The portable terminal 1 may have a talking function, an email (or e-mail) communicating function, an Internet connection (or Web accessing) function, a television function by which a digital TV broadcast (e.g., "One Seg" (one-segment digital terrestrial broadcast) can be received and watched), and a recording function. The recording function includes a content storing function to record contents (not only image but also audio: the same shall apply hereafter) received via TV broadcasting or the like.

When the portable terminal 1 is connected to a radio communication network 2 (mobile communication network) via the nearest base station 2A and exchange 2B, the portable terminal 1 is communicable with another portable terminal 1' via the radio communication network 2.

When the portable terminal 1 is connected to the Internet via the radio communication network 2, the portable terminal 1 can access a Web site to browse it.

The portable terminal 1 can also perform streaming that downloads multimedia content data (e.g., video, static images, music, and news) from a server 4 via the Internet 3 and the radio communication network 2 and simultaneously reproduces the data.

In addition, the portable terminal 1 can receive content data of a digital terrestrial broadcast, that is transmitted from a TV station 5 via a transmission antenna 6. The portable terminal 1 can download and receive a digital broadcast program from the server 4 via the radio communication network 2 and the Internet 3, such as Internet radio.

As described above, the portable terminal 1 can (i) receive broadcasted content data by means of the television function and (ii) download and receive content data for streaming by means of the Internet connection function.

The portable terminal 1 can also obtain various contents from a storage medium 7 such as a detachable and portable memory card or obtain various content data from an external device 8 such as another portable terminal 1' via short-range communication such as Bluetooth (registered trademark) or infrared communication.

Figure 2:
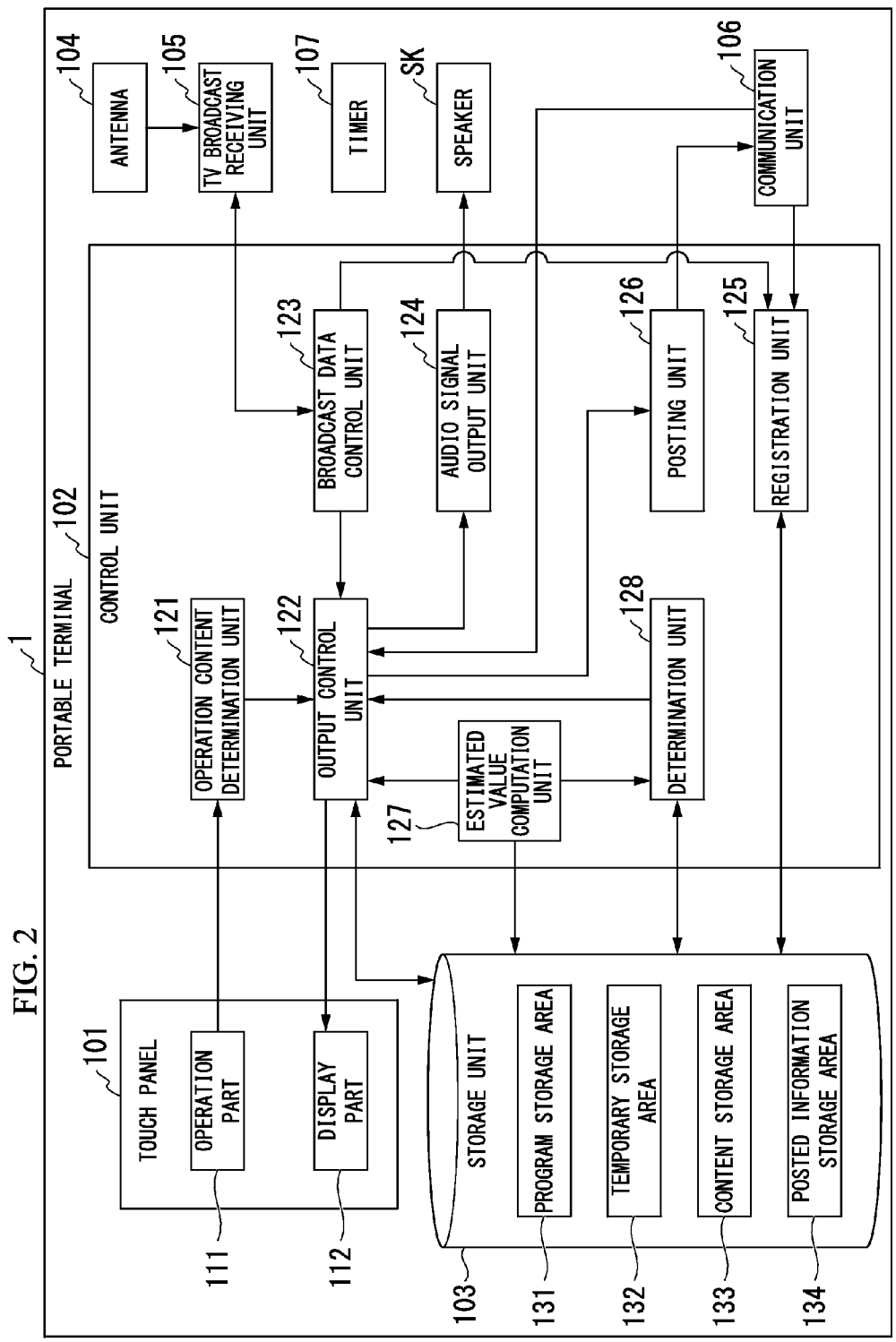
FIG. 2 is a block diagram showing an example of the structure of a display apparatus (portable terminal) pertaining to the embodiment of the present invention.

FIG. 2 is a block diagram showing basic structural elements of the portable terminal 1.

The portable terminal 1 has a touch panel 101, a control unit 102, a storage unit 103, an antenna 104, a TV broadcast receiving unit 105, a communication unit 106, a timer 107 and a speaker SK.

The touch panel 101 includes an operation part 111 and a display part 112.

The operation part 111 has a sensor that detects a user's operation. The operation part 111 outputs a result of the detection utilizing the sensor to the control unit 102. In the present embodiment, the operation part 111 utilizes the sensor to detect a contact position of a user's finger that contacts an operation screen at specific time intervals. The operation part 111 outputs a result of the detection utilizing the sensor.

The present invention is not limited to this manner. For example, a non-contact sensor may be utilized to detect a position of a user's finger or an operation designating device that is close to the operation screen.

The display part 112 displays a content according to the control of the control unit 102. In the present embodiment, the display part 112 is integrated with the operation part 111 to form the touch panel 101. The display part 112 displays an operation screen utilized when the operation part 111 accepts a user's operation. In addition, the display part 112 functions as the output unit of the present invention.

The control unit 102 retrieves various information items stored in the storage unit 103 so as to generally control the portable terminal 1. The control unit 102 includes an operation content determination unit 121, an output control unit 122, a broadcast data control unit 123, an audio signal output unit 124, a registration unit 125, a posting unit 126, an estimated value computation unit 127, and a determination unit 128.

Based on an signal output from the operation part 111, the operation content determination unit 121 performs a determination for the operation content detected by the operation part 111. For example, the operation content determination unit 121 determines a movement of a user's finger based on a contact position and a contact time (period) of the user's finger, which are indicated by the result of the detection utilizing the operation part 111. The operation content determination unit 121 further determines an operation content indicated by the determined movement of the user's finger based on a positional relationship between the determined movement of the user's finger and an image displayed on the display part 112 when the relevant operation was detected.

For example, when the operation part 111 detected an operation of the user's finger that contacts an icon or text part on the display screen, the operation content determination unit 121 determines that the relevant operation is a touch operation. When the operation part 111 detected an operation of the user's finger that moves while an icon part or a predetermined operation area has been selected by the touch operation, the operation content determination unit 121 determines that the relevant operation is a sliding operation.

In addition, the operation content determination unit 121 determines the operation content detected by the operation part 111 based on time information measured by the timer 107.

Additionally, the operation content determination unit 121 may command the output control unit 122 to display a content according to the relevant operation content based on a result of the corresponding determination.

For example, if the operation content is determined to be the touch operation, the operation content determination unit 121 controls the output control unit 122 to display an icon image, that indicates the contact position of the user's finger, overlapped on the operation screen. In the present embodiment, the operation content determination unit 121 may display a finger icon, that indicates the contact position, at a part contacted by the finger.

Based on the operation content indicated by a result of the determination performed by the operation content determination unit 121, the output control unit 122 executes a control to display an image on the display part 112 or a control to output sound from the speaker SK. In the present embodiment, the output control unit 122 executes a content image display process to display a content on a content screen of the display part 112 based on content data and a posting image display process to display information pertaining to posted information (posted on a Web page) on a posting screen of the display part 112.

The information pertaining to posted information includes (i) posted information itself, (ii) posting result information that indicates a result of posting about information posted during a time period of the broadcast of the relevant content, and (iii) analyzed result information that indicates a posting status for the information posted during the time period of the broadcast of the content.

In accordance with a setup condition designated by the user, the output control unit 122 can switch a display mode between a simultaneous display mode in which the content display screen and the posting screen are displayed side by side as a single screen and a single display mode in which any one of the screens is displayed over the whole screen area of the display part 112. Specifically, when the user designates any one of the simultaneous display mode and the single display mode, the output control unit 122 performs switching of the screen displayed on the display part 112 according to the designated mode.

If an operation to designate outputting of a recorded content is input into the operation part 111, the output control unit 122 retrieves designated content data from the storage unit 103 and performs a control to display an image based on the retrieved content data on the display part 112 or to output sound based on the retrieved content data from the speaker SK.

If real-time display of received content data (i.e., real-time mode) has been set, the broadcast data control unit 123 controls, based on digitally modulated content data input from the TV broadcast receiving unit 105, the output control unit 122 to display the content data on the display part 112.

If displaying received content data after storing it in the storage unit 103 (i.e., recording mode) has been set, the broadcast data control unit 123 performs a control to store the digitally modulated content data input from the TV broadcast receiving unit 105 in the storage unit 103.

When the audio signal output unit 124 receives a reception baseband signal demodulated by the output control unit 122, the audio signal output unit 124 makes the speaker SK output sound based on the reception baseband signal.

The registration unit 125 stores in the storage unit 103, information received via the communication unit 106 and content data received from the broadcast data control unit 123.

The posting unit 126 posts the posted information to a Web page.

Based on the posted information received from the server, the estimated value computation unit 127 computes an estimated value utilized to estimate a posting status for the posted information that is posted on a Web page in association with the relevant content. Here, the estimated value computation unit 127 can compute (i) an estimated value for a content (called a "main content") currently displayed on the display part 112 and (ii) an estimated value for a content (called a "sub-content") that is currently not displayed on the display part 112.

The estimated value computation unit 127 computes the estimated value for the main content at regular time intervals. When there is a user setup condition (set by the user) that designates computation of the estimated value for the sub-content, the estimated value computation unit 127 computes the estimated value for the sub-content.

Based on the estimated value computed by the estimated value computation unit 127, the determination unit 128 determines whether or not a switching condition for switching the content from the main content to the sub-content is satisfied.

As the switching condition, various conditions can be set.

For example, the switching condition is satisfied when the estimated value for the main content is less than a predetermined threshold th1 (which is called "estimated value condition 1").

In another example, the switching condition is satisfied when the estimated value for the main content is less than a predetermined threshold th1 and the estimated value for the sub-content is greater than or equal to the threshold th1 (which is called "estimated value condition 2").

In another example, the switching condition is satisfied when the estimated value for the main content is less than the estimated value for the sub-content (which is called "estimated value condition 3").

In another example, the switching condition is satisfied when a time period during which at least one of the above estimated value conditions 1 to 3 is satisfied is longer than a predetermined time (which is called "estimated value condition 4").

In another example, the switching condition is satisfied when at least one of the above estimated value conditions 1 to 4 is satisfied in a commercial time inserted into the main part of the main content (which is called "estimated value condition 5").

The storage unit 103 stores various information items utilized in processes performed in the portable terminal 1. The storage unit 103 may include a program storage area 131, a temporary storage area 132, a content storage area 133, and a posted information storage area 134.

The storage unit 103 may be formed utilizing a detachable and portable memory (storage medium) such as an SD card or an IC card or may be provided in a specific external server (not shown).

The program storage area 131 is a storage area utilized to store a program and various applications, by which the present embodiment is implemented in accordance with an operation input from the user.

The temporary storage area 132 is a work area to temporarily store various information items by which the portable terminal 1 can operate.

The content storage area 133 is a storage area utilized to store content data of, for example, content data of TV broadcast, which is received by the TV broadcast receiving unit 105. The content storage area 133 may store content data of a broadcast program, recording of which has been programmed, or content data downloaded from a server on a network.

In addition to such content data, the content storage area 133 stores received content IDs and content related information that indicates an attribute of each content. The content ID is individual identification information assigned to each content. The content related information may include the name of a TV station which broadcasts a program corresponding to the relevant content or information that indicates the content of a TV program (e.g., the names of performers or the category name).

The posted information storage area 134 is a storage area to store information pertaining to posting such as information posted on a Web page. Based on information received from the server 4, the posted information storage area 134 stores information in which reproduction position in a content is associated with the timing of posting of information posted during the broadcast of the content.

The antenna 104 receives radio waves having a frequency defined for a TV broadcast and outputs an analog signal of the received radio waves to the TV broadcast receiving unit 105.

The TV broadcast receiving unit 105 implements the TV function by means of the antenna 104. The TV broadcast receiving unit 105 receives content data of a one-segment digital terrestrial broadcast (One Seg) for portable terminals and also receives program information such as an electronic program table (or EPG (Electronic Program Guide)).

The TV broadcast receiving unit 105 has an analog circuit part that extracts broadcast data of a preselected channel from among broadcast data items received by the antenna 104 utilized for TV and a digital circuit part that digitally modulates the broadcast data.

The digital circuit part may (i) subject the received data to OFDM (Orthogonal Frequency-Division Multiplexing) demodulation, (ii) isolate each of video, audio, and data (character data) from multiplexed broadcast data and decode them, and (iii) decompress compressed data.

The communication unit 106 is connected to the radio communication network 2 and the Internet 3 via the base station 2A and the exchange 2B. The communication unit 106 may receive, via the Internet 3, posted information or the like sent from the Internet 3.

The timer 107 measures the present date and time and outputs information about the measured date and time.

Figure 3:
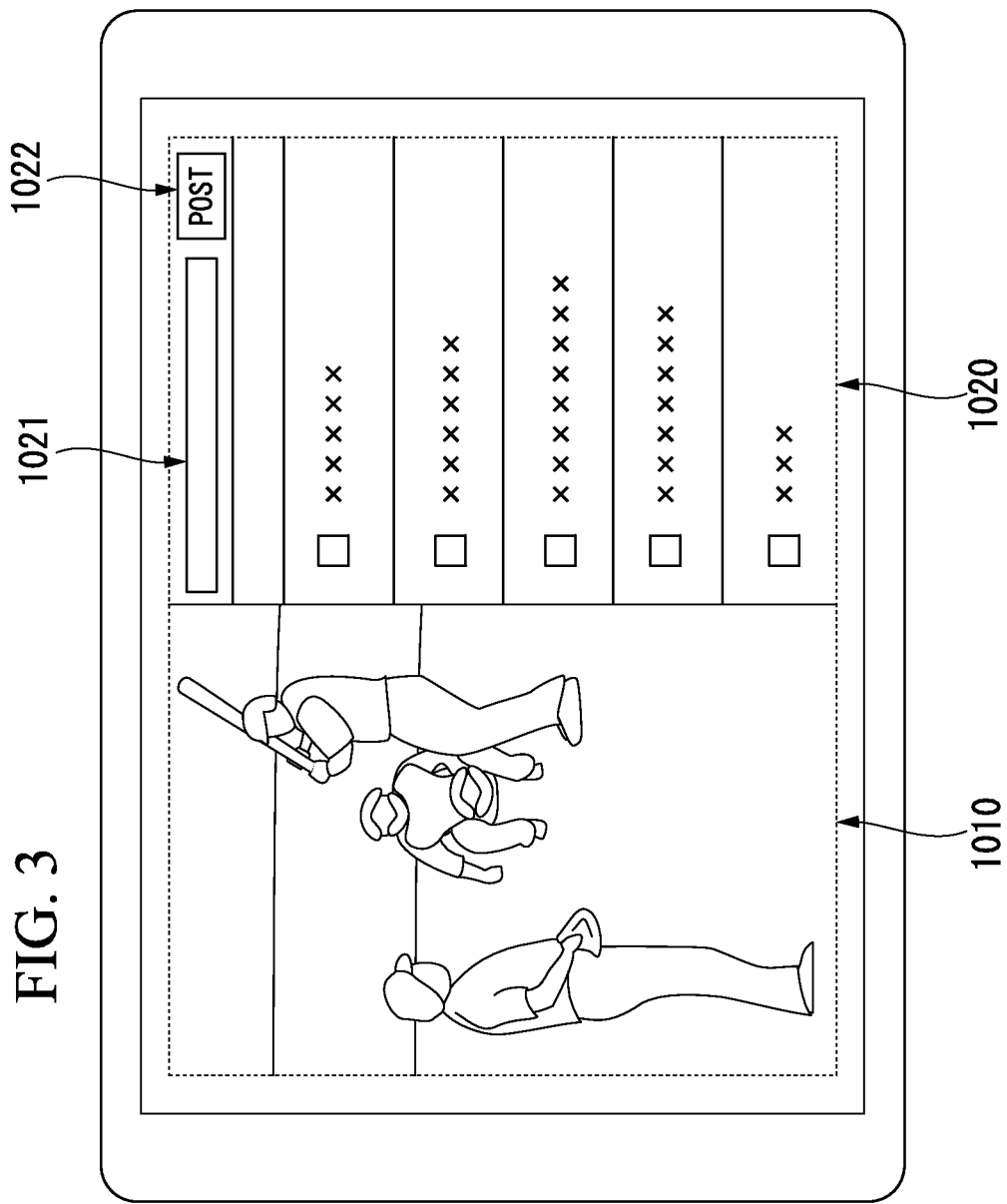
FIG. 3 is a diagram showing an example of a display screen that is displayed on a display part of the display apparatus (portable terminal) pertaining to the embodiment of the present invention.

Next, referring to FIG. 3, an example of a screen displayed on the display part 112 of the touch panel 101. Specifically, FIG. 3 is a diagram showing an example of the screen that simultaneously shows a content display area 1010 for displaying a content display screen and a posted information display area 1020 for displaying a posting screen.

As shown in FIG. 3, the entire area of the display part 112 may be divided into halves, where the content display screen is displayed on one (i.e., content display area 1010) of them and the posting screen is displayed on the other (i.e., posted information display area 1020).

In this example of FIG. 3, a live program of a baseball game is displayed in the content display area 1010 and posted information pertaining to the live baseball game is displayed in the posted information display area 1020. Here, contents obtained by the service of Twitter (registered trademark) are displayed in the posted information display area 1020.

As shown in the figure, a plurality of posted information items are displayed sequentially, which are arranged in a time series manner according to each posting time.

In the posted information display area 1020, in input field 1021 into which information to be posted is input and a posting button 1022 are displayed. The input field 1021 and the posting button 1022 each function as an operation screen area in which a touch or sliding operation is detected.

When the input field 1021 is designated by the touch operation, the operation content determination unit 121 determines that an operation that designates the start of input of information to be posted is accepted. When the posting button 1022 is designated by the touch operation, the operation content determination unit 121 determines that an operation that posts the information input into the input field to Twitter (registered trademark) is accepted.

Figure 4:
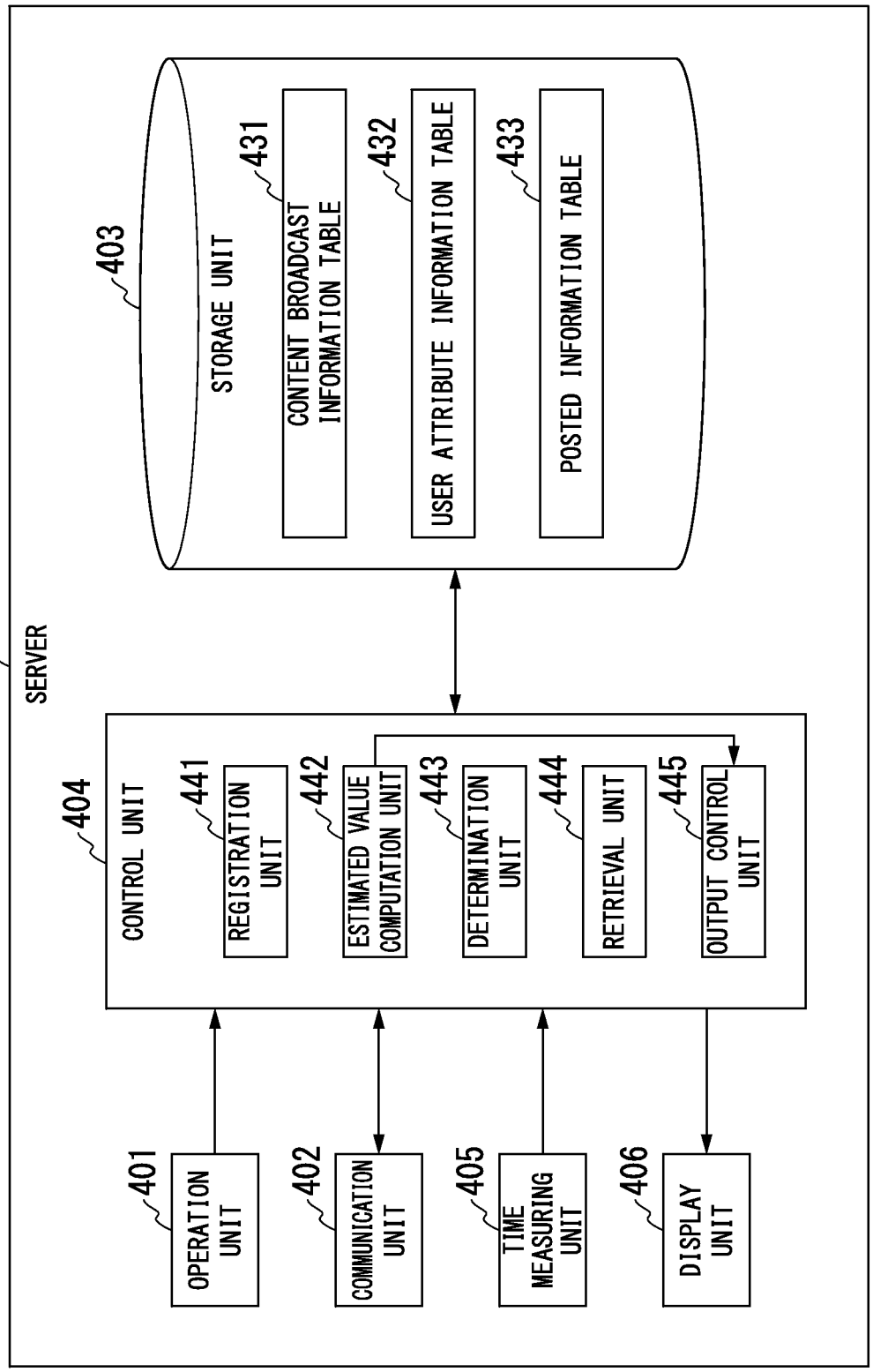
FIG. 4 is a diagram showing an example of the structure of a server pertaining to the embodiment of the present invention.

Next, referring to FIG. 4, the server 4 is explained. FIG. 4 is a diagram showing an example of the structure of the server 4.

As shown in FIG. 4, the server 4 has an operation unit 401, a communication unit 402, a storage unit 403, a control unit 404, a time measuring unit 405, and a display unit 406.

The operation unit 401 detects an operation of a manager of the server and outputs an operation signal that indicates the detected operation.

The communication unit 402 performs information communication with the portable terminal 1 via the Internet 3 and the radio communication network 2.

The storage unit 403 includes a content broadcast information table 431, a user attribute information table 432, and a posted information table 433.

FIG. 5 is a diagram that indicates an example of the content broadcast information table 431.

The content broadcast information table 431 is a table that stores information that indicates each content ID, information that indicates each broadcast time period, and content related information are associated with each other.

Target contents may be video and audio of digitally broadcasted TV programs, sound of a streamed radio program or music. In the following explanation of the present embodiment, the contents are video and audio of digitally broadcasted TV programs.

The broadcast time period is a predetermined time period during which a target content is broadcasted or delivered. The content related information is information predetermined as that related to the target content.

When the contents are video and audio of TV programs, the content related information includes names of a program, a broadcast station, and a performer, a category name of a program, information that is related to the content of each program, and the like. The content related information may be information predetermined by a broadcast station that broadcasts the relevant TV program or a production studio for the program and may be determined by the manager of the server 4.

FIG. 6 is a diagram that indicates an example of the user attribute information table 432.

The user attribute information table 432 is a table that stores that stores information that indicates each poster ID and information items about sex, age, and favorite category of each poster are associated with each other.

In the present embodiment, the poster ID is an individual terminal ID allocated to each portable terminal 1 that sends information to be posted. When the user of each poster ID signs up with a posting service, the user may register attribute information (e.g., sex and age) of the poster with the service. In this table, such registered information is associated with the poster ID.

FIG. 7 is a diagram that indicates an example of the posted information table 433.

The posted information table 433 is a table that stores that stores the information that indicates the poster ID, information that indicates posting timing (posting time), posted information, and information that indicates the content ID of the content corresponding to the posted information are associated with each other.

The poster ID is individual identification information utilized to identify the poster. In the present embodiment, the poster ID is the individual terminal ID allocated to each portable terminal 1 that sends information to be posted.

The posting timing is the date and time when the posted information was received from the portable terminal 1.

The posted information is information that indicates posted content transmitted from the portable terminal 1 to the server 4.

As described above, the storage unit 403 utilizes the content ID to store posting correspondence relationship information in which the broadcast time period of each content (i.e., reproduction position in the content) stored in the content broadcast information table 431 and the posting time (i.e., posting timing of information posted during the broadcast of the content) stored in the posted information table 433 are associated with each other.

The control unit 404 has a registration unit 441, an estimated value computation unit 442, a determination unit 443, a retrieval unit 444, and an output control unit 445.

The registration unit 441 stores the posted information received from the portable terminal 1 in the posted information table 433 of the storage unit 403.

More specifically, after receiving the posted information from the portable terminal 1 via the communication unit 402, the registration unit 441 obtains date and time information as a posting time that indicates the posting timing at which the posted information was posted, where the date and time information is output from the time measuring unit 405 when the server 4 has received the posted information. The registration unit 441 also obtains the terminal ID of the portable terminal 1 associated with the received posted information, as the poster ID.

The registration unit 441 then associates the received posted information with the posting time and the poster ID (obtained from the posted information) so as to store the associated information items in the posted information table 433.

Based on the posted information stored in the storage unit 403, the estimated value computation unit 442 computes an estimated value utilized to estimate the posting status for the posted information that is posted on a Web page in association with the relevant content. Since the estimated value computation unit 442 has a function similar to that of the estimated value computation unit 127, detailed explanation thereof are omitted here.

Based on the estimated value computed by the estimated value computation unit 442, the determination unit 443 determines whether or not a switching condition for switching the content from the main content to the sub-content is satisfied. Since the determination unit 443 has a function similar to that of the determination unit 128, detailed explanation thereof are also omitted here.

The retrieval unit 444 refers to the posted information stored in the storage unit 403 and retrieves information corresponding to the designated content ID or broadcast time period.

Figure 8:
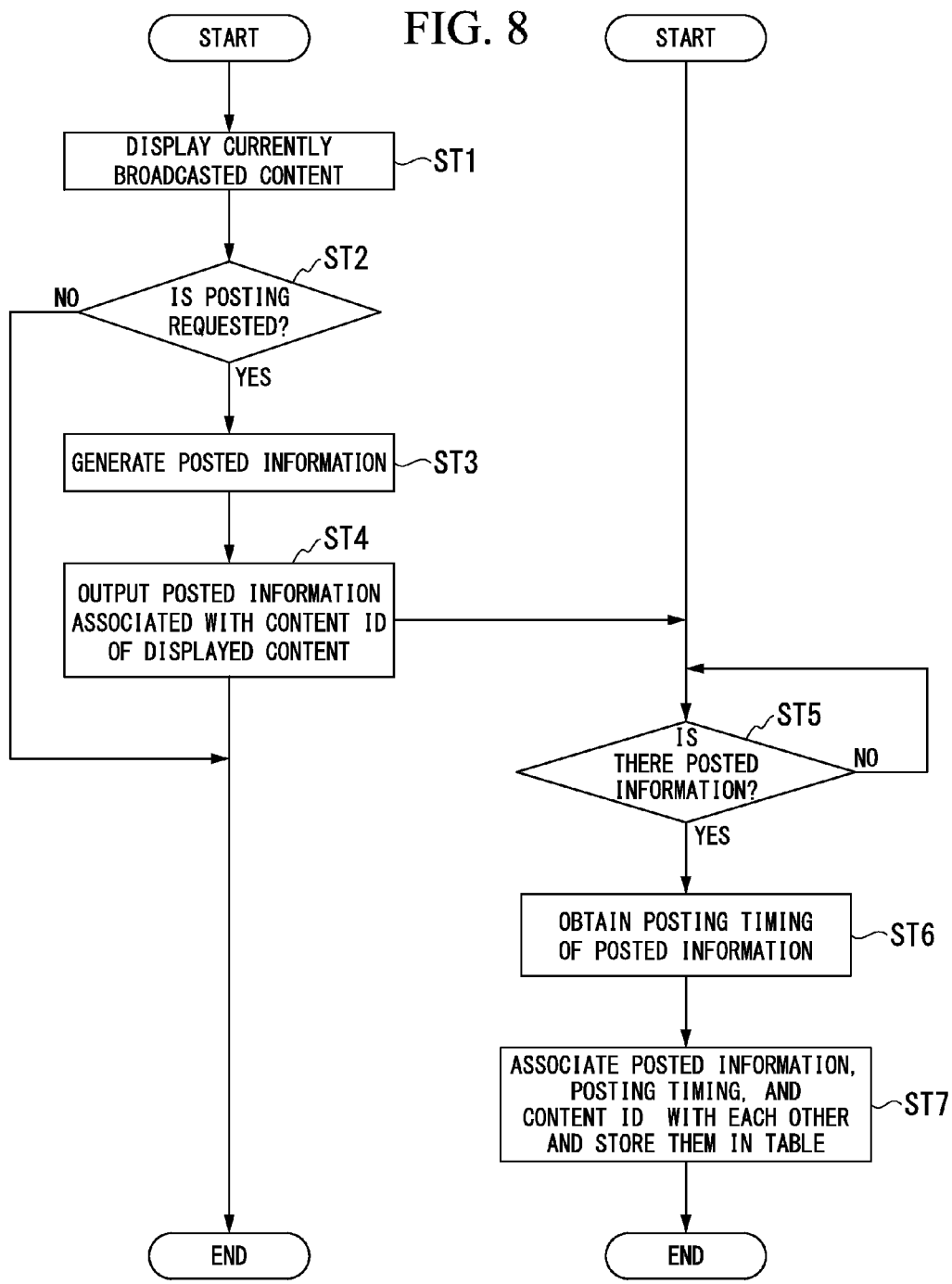
FIG. 8 is a flowchart utilized to explain an example of the registration method of posted information pertaining to the embodiment of the present invention.

Next, referring to FIG. 8, an example of the registration method of posted information in the present embodiment will be explained. FIG. 8 is a flowchart utilized to explain the example of the registration method of posted information in the present embodiment. In FIG. 8, an operation flow for the portable terminal 1 and an operation flow for the server 4 are explained in parallel.

Step ST1

If an operation to designate displaying a content of a currently broadcasted TV program on the display part 112 is input via the touch panel 101 from a user, the display part 112 outputs the current content on the display part 112 based on information (digital signal) converted from received broadcast radio waves.

When the current content includes audio and the portable terminal 1 is set to be in a mode that can output sound (e.g., when the mode is not set to a silent mode or the like), the output control unit 122 makes the speaker SK output the audio included in the content.

Step ST2

The control unit 102 of the portable terminal 1 determines whether or not posting of information to be posted has been designated via the operation part 111.

Step ST3

Here it is assumed that information to be posted is input from the user via the touch panel 101. More specifically, it is assumed that after the input field 1021 displayed on the display part 112 of the touch panel 101 is designated and information to be posted is input, the posting button 1022 is touched. Accordingly, the operation content determination unit 121 determines that posting of the information input into the input field 1021 has been requested and outputs an operation signal that indicates the determined result to the output control unit 122.

Step ST4

When accepting the posted information, the output control unit 122 associates the content ID of the content displayed on the display part 112 with the posted information and outputs the associated information to the posting unit 126.

The posting unit 126 sends information via the communication unit 106 to the server 4. That is, the posting unit 126 posts information in which the posted information is associated with the content ID of the displayed content.

If the user is watching a content of a currently broadcasted "CH1 (channel 1) program A", the output control unit 122 generates information in which a content ID of "0001" which indicates this program, posted information, and information which indicates the terminal ID (that indicates the portable terminal 1) are associated with each other and outputs the generated information to the posting unit 126. The posting unit 126 sends received information to the server 4 via the communication unit 106.

Step ST5

On the other hand, the server 4 determines whether or not posted information is received.

Step ST6

When the communication unit 402 of the server 4 has received posted information, the registration unit 441 of the control unit 404 obtains information, that indicates the current time measured by the time measuring unit 405, as information which indicates the timing of the posting of the relevant posted information.

As the posting timing, the registration unit 441 may obtain information which indicates a posting date and time "2011.10.10.19:03".

Step ST7

The registration unit 441 then associates the information which indicates the posting timing with the information received from the portable terminal 1 and stores the associated information in the posted information table 433.

More specifically, the registration unit 441 writes information "11111" which indicates the terminal ID of the portable terminal 1 into a field for the poster ID in the posted information table 433.

The registration unit 441 writes the obtained information "2011.10.10.19:03" which indicates the posting timing into a field for the posting time in the posted information table 433.

Furthermore, the registration unit 441 writes the posted information into a field for the posted information in the posted information table 433.

The registration unit 441 also writes the content ID "0001" which indicates the target program into a field for the content ID in the posted information table 433.

Accordingly, in the storage unit 403, the broadcast time period of the content (i.e., reproduction position in the content) stored in the content broadcast information table 431 (prepared in advance) is associated with the posting time (i.e., posting timing of the information posted during the broadcast of the content) stored in the 433 by means of the content ID, and the posting correspondence relationship information is stored in the storage unit 403.

Figure 9:
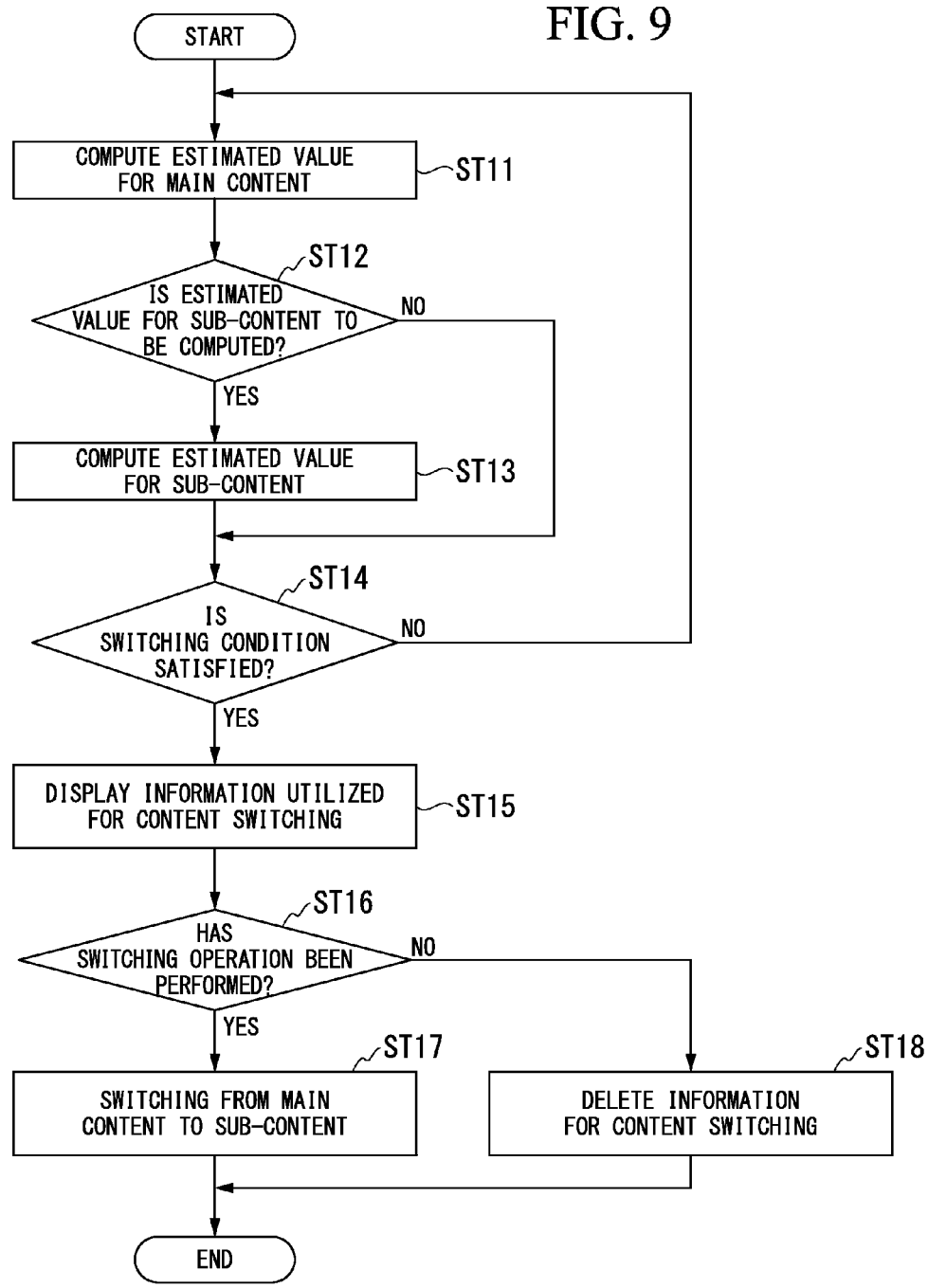
FIG. 9 is a flowchart utilized to explain an example of the display method pertaining to the embodiment of the present invention.

Next, referring to FIG. 9, an example of a display method in the present embodiment will be explained. FIG. 9 is a flowchart utilized to explain the display method in the present embodiment. Although an example of the operation flow performed by the portable terminal 1 is shown in FIG. 9, a corresponding display can also be implemented in the display unit 406 of the server 4 utilizing a similar flow.

Step ST11

The estimated value computation unit 127 of the portable terminal 1 computes the estimated value for the main content.

More specifically, the portable terminal 1 displays the contents of a currently broadcasting TV program on the display part 112. When a unit time (e.g., a few seconds) predetermined as timing for computing the estimated value for the main content has elapsed, the communication unit 106 of the portable terminal 1 sends a main content posted information request signal, which includes the content ID "0001" of the main content displayed on the display part 112, to the server 4. The main content posted information request signal is a signal utilized to request transmission of the posted information that was posted in association with the main content.

When the server has received the main content posted information request signal that includes the content ID "0001", the retrieval unit 444 of the server 4 retrieves, from among posted information items posted within a period from the current time back to a previous time by a unit time (e.g. a few seconds before), posted information posted associated with the content indicated by the content ID "0001" from the posted information table 433 of the storage unit 403. The communication unit 402 of the server 4 sends the retrieved posted information to the portable terminal 1.

The communication unit 106 of the portable terminal 1 receives the posted information from the server 4, and the registration unit 125 writes the received information into the posted information storage area 134 of the storage unit 103. The estimated value computation unit 127 then retrieves the posted information from the posted information storage area 134 and computes the estimated value of the main content.

As the estimated value, the estimated value computation unit 127 may compute a relative value pertaining to the number of posted information items obtained per a unit time.

The estimated value computation unit 127 may extract a positive term predetermined for the posted information and compute a relative value (as the estimated value) pertaining to the number of positive terms which appeared per a unit time. The positive term is a predetermined term utilized to indicate that the posting status is active and may be "Like", "w", emotions or face marks (e.g., (^o^), or the like.

The estimated value computation unit 127 associates the computed estimated value with the posting time of the posted information and stores the associated information in the temporary storage area 132.

Step ST12

The estimated value computation unit 127 then determines whether or not the estimated value for the sub-content is to be computed. Specifically, it is determined whether or not there is a user setup condition that requests the computation of the estimated value for the sub-content.

Step ST13

When there is a user setup condition that requests the computation of the estimated value for the sub-content, the estimated value computation unit 127 computes the estimated value for the sub-content.

For example, when a set switching condition requires comparison between the estimated value for the main content and the estimated value of the sub-content or comparison of the estimated value for the sub-content with a threshold, the estimated value computation unit 127 computes the estimated value for the sub-content.

More specifically, the communication unit 106 of the portable terminal 1 sends a sub-content posted information request signal, that includes the content ID "0001" of the main content displayed on the display part 112, to the server 4. The sub-content posted information request signal is a signal utilized to request transmission of posted information, from among currently broadcasted contents, that was posted in association with a sub-content other than the main content.

After receiving the sub-content posted information request signal that includes the content ID "0001", the retrieval unit 444 of the server 4 retrieves, from among posted information items posted within a period from the current time back to a previous time by a unit time (e.g. a few seconds before), posted information posted associated with a content indicated by a content ID (e.g., "0002", "0003", "0004", "0005", or . . . ) of a sub-content (i.e., other than the content ID "0001") from the posted information table 433 of the storage unit 403. The communication unit 402 of the server 4 sends the retrieved posted information to the portable terminal 1.

The communication unit 106 of the portable terminal 1 receives the posted information from the server 4, and the registration unit 125 writes the received information into the posted information storage area 134 of the storage unit 103.

The estimated value computation unit 127 then retrieves the posted information from the posted information storage area 134 and computes the estimated value of the sub-content. If there are a plurality of sub-contents, the estimated value computation unit 127 computes an individual estimated value of each sub-content.

The estimated value computation unit 127 associates the computed estimated value with the posting time of the posted information and stores the associated information in the temporary storage area 132.

Step ST14

Based on the estimated value computed by the estimated value computation unit 127, the determination unit 128 determines whether or not a switching condition utilized for switching the main content to the sub-content is satisfied. The determination unit 128 outputs information that indicates a result of the determination to the output control unit 122.

If the above-described estimated value condition 1 is employed, the determination unit 128 refers to the temporary storage area 132 of the storage unit 103 and determines whether or not the estimated value for the main content is less than the predetermined threshold th1. If the estimated value for the main content is less than the predetermined threshold th1, the determination unit 128 determines that the switching condition is satisfied.

If the above-described estimated value condition 2 is employed, the determination unit 128 refers to the temporary storage area 132 of the storage unit 103 and determines whether or not the estimated value for the main content is less than the predetermined threshold th1 and the estimated value for the sub-content is greater than or equal to the threshold th1. If the estimated value for the main content is less than the predetermined threshold th1 and there is a sub-content whose estimated value is greater than or equal to the threshold th1, the determination unit 128 determines that the switching condition is satisfied.

If the above-described estimated value condition 3 is employed, the determination unit 128 refers to the temporary storage area 132 of the storage unit 103 and determines whether or not the estimated value for the main content is less than the estimated value for the sub-content. When there are a plurality of sub-contents, the determination unit 128 determines whether or not the maximum value among the estimated values for the sub-contents is greater than or equal the estimated value for the main content.

If the estimated value for the main content is less than the estimated value for the sub-content, the determination unit 128 determines that the switching condition is satisfied.

If the above-described estimated value condition 4 is employed, the determination unit 128 refers to the temporary storage area 132 of the storage unit 103 and determines whether or not a time period during which at least one of the above estimated value conditions 1 to 3 is satisfied is longer than the predetermined time. That is, the determination unit 128 determines whether or not a state having a high necessity for switching the main content to the sub-content has continued for a predetermined time period.

If the time period during which at least one of the above estimated value conditions 1 to 3 is satisfied is longer than the predetermined time, the determination unit 128 determines that the switching condition is satisfied.

If the above-described estimated value condition 5 is employed, the determination unit 128 refers to the temporary storage area 132 of the storage unit 103 and determines whether or not at least one of the above estimated value conditions 1 to 4 is satisfied in a commercial time inserted into the main part of the main content. If at least one of the above estimated value conditions 1 to 4 is satisfied in a commercial time inserted into the main part of the main content, the determination unit 128 determines that the switching condition is satisfied.

That is, even though said at least one of the above estimated value conditions 1 to 4 is satisfied, if such satisfaction is determined during a time period for the main part of the main content, the determination unit 128 determines that the switching condition is not satisfied.

Step ST15

If the information, that is input from the determination unit 128 and indicates the determined result, shows a determined result that indicates the switching condition is satisfied, the output control unit 122 controls the display part 112 to display information utilized to switch the content that is displayed on the display part 112.

For example, the output control unit 122 displays a message that recommends the switching of the main content or an UI (User Interface) utilized to input an switching operation on the display part 112.

the output control unit 122 may display information utilized to switch the content from the main content to the sub-content on the display part 112.

For example, the output control unit 122 displays information that indicates types of possible sub-contents for the switching or a GUI (Graphical User Interface) utilized to switch to a designated sub-content on the display part 112.

Step ST16

The operation content determination unit 121 then determines whether or not an operational designation for switching the content displayed on the display part 112 to a sub-content has been input into the operation part 111.

Step ST17

When such an operational designation for switching the content displayed on the display part 112 to a sub-content has been input into the operation part 111, the output control unit 122 switches the content displayed on the display part 112 to a designated sub-content.

If a target sub-content for the switching has not been designated, the output control unit 122 may perform the switching to a sub-content that has the maximum estimated value (i.e., has the highest evaluation) among a plurality of sub-contents.

Step ST18

If such an operational designation for switching the content displayed on the display part 112 to a sub-content has not been input into the operation part 111 for a specific period of time or an instruction to perform no operational designation for such switching is input, the control unit 102 terminates the operation of the flow.

Here, the control unit 102 starts the operation starting from step ST11 when the time for computing the estimated value for the main content has come.

Figure 10:
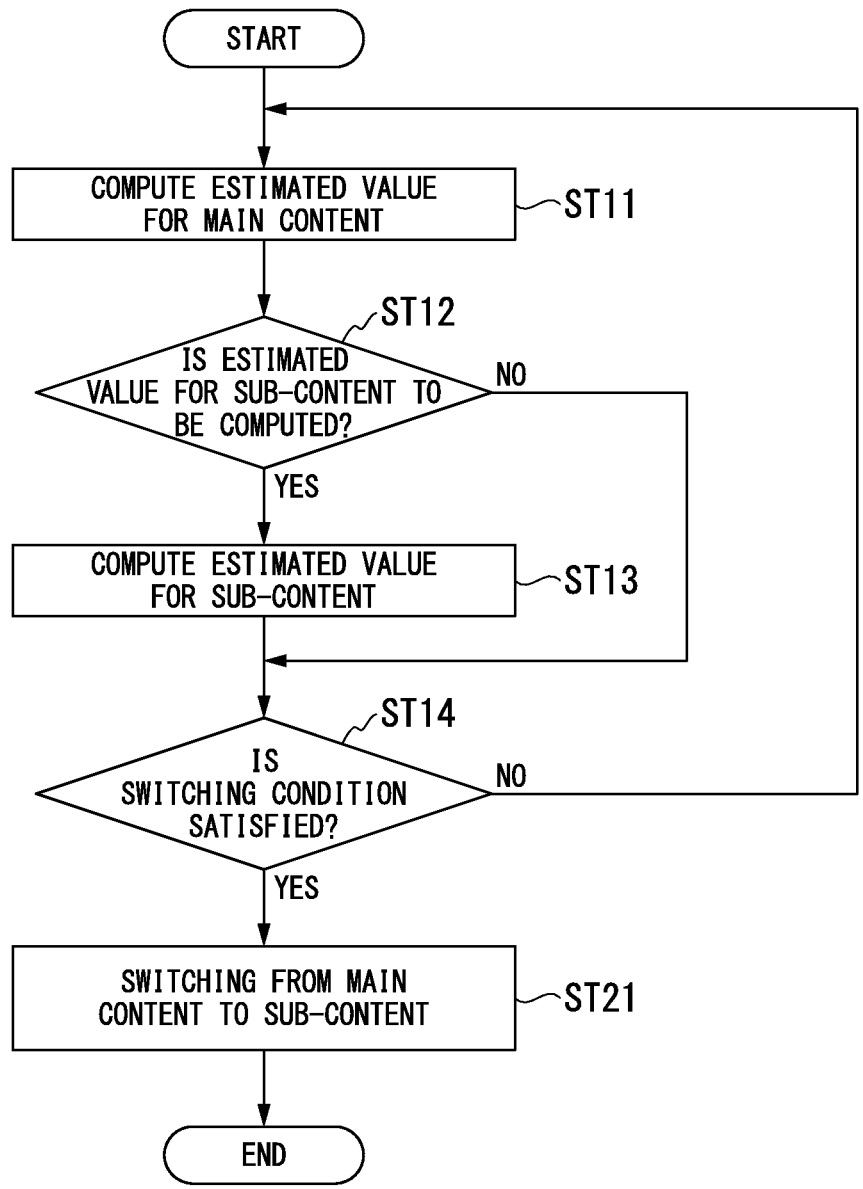
FIG. 10 is a flowchart utilized to explain another example of the display method pertaining to the embodiment of the present invention.

Next, referring to FIG. 10, another example of a display method in the present embodiment will be explained. FIG. 10 is a flowchart utilized to explain the display method in the present embodiment. Although an example of the operation flow performed by the portable terminal 1 is shown in FIG. 10, a corresponding display can also be implemented in the display unit 406 of the server 4 utilizing a similar flow.

In addition, steps similar to those explained in FIG. 9 are given identical step numbers and detailed explanations thereof are omitted. Specifically, steps Step ST11 to ST14 are executed also in the present example.

Step ST21

If the information, that is input from the determination unit 128 and indicates the determined result, shows a determined result that indicates the switching condition is satisfied, the output control unit 122 switches the content displayed on the display part 112 to a selected sub-content.

More specifically, when determining that the switching condition is satisfied, the determination unit 128 selects a sub-content that is most appropriate as a target sub-content for the switching. For example, the determination unit 128 may select, as the most appropriate sub-content, a sub-content that has the maximum estimated value (i.e., has the highest evaluation) among a plurality of sub-contents.

If user's attribute information is stored in the portable terminal 1, the determination unit 128 may the determination unit 128 may select, as the most appropriate sub-content, a sub-content whose posters (who posted information associated with the relevant content) have attributes identical or similar to those of the main content. In this case, in the estimated value computation, the estimated value computation unit 127 can obtain attribute information for each poster, that is associated with the posted information, from the server 4 in advance and compute, for each attribute information item, an estimated value that evaluates the posting status of the posted information.

Accordingly, when the switching condition is satisfied, the content displayed on the display part 112 is automatically switched to a selected sub-content, which can reduce the operation performed by the user.

Figure 11A:
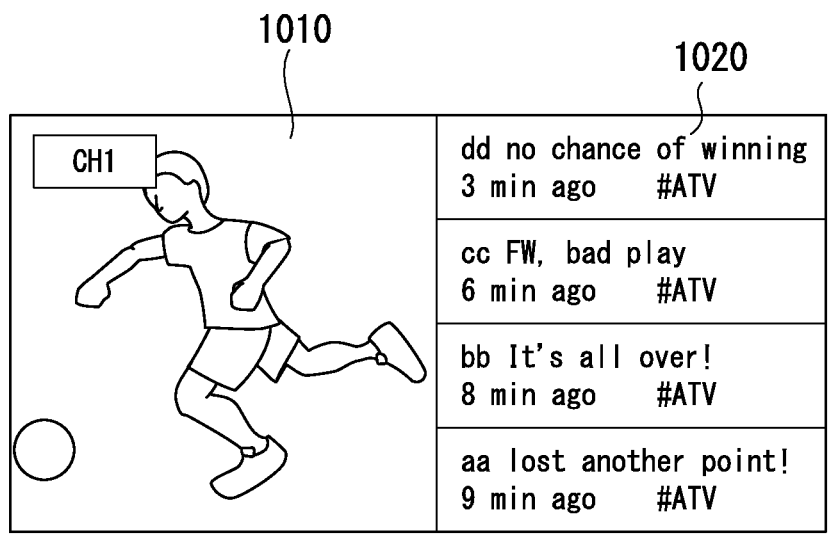
FIG. 11A is a diagram to show an example of the information utilized to switch the content pertaining to the embodiment of the present invention.
Figure 11B:
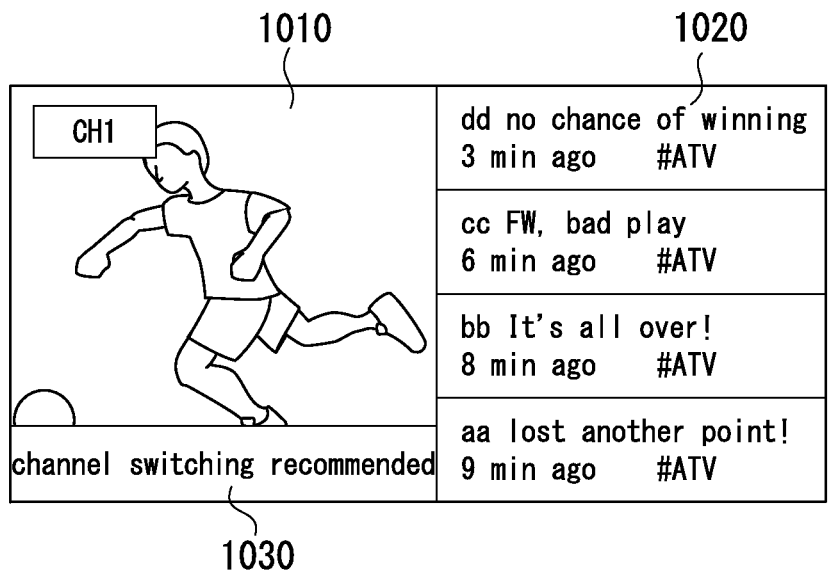
FIG. 11B is a diagram to show the above example of the information utilized to switch the content, similarly.

Next, referring to FIGS. 11A and 11B, an example of the information utilized to switch the content, which is displayed on the display part 112, will be explained. FIGS. 11A and 11B are diagrams to show the example of the information utilized to switch the content in the present embodiment.

As shown in FIG. 11A, the display part 112 displays a main content "CH1 program A" in the content display area 1010, and posted information, which was posted in association with the main content "CH1 program A", is displayed in the posted information display area 1020. In this posted information display area 1020, four posted information items which were posted 3, 6, 8, and 9 minutes ago from the current time are displayed in time series.

If the determination unit 128 (or the determination unit 443) determines that the switching condition is satisfied, the display part 112 displays (see FIG. 11B) a switching message display area 1030 to display the information utilized to switch the content, under the content display area 1010. In this switching message display area 1030, a message to recommend the content switching, such as "channel switching recommended" is displayed.

According to such a message display to recommend the channel switching, the user can be informed of the timing for switching to another channel.

Figure 12A:
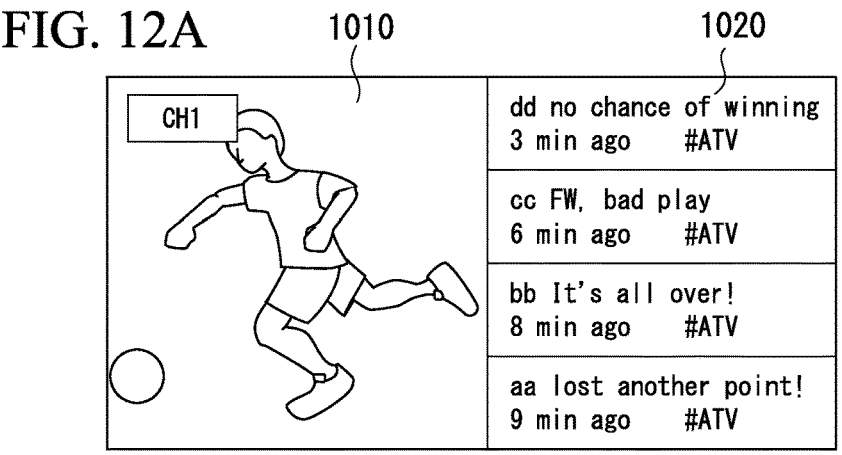
FIG. 12A is a diagram to show an example of the information utilized to switch the content pertaining to the embodiment of the present invention.
Figure 12B:
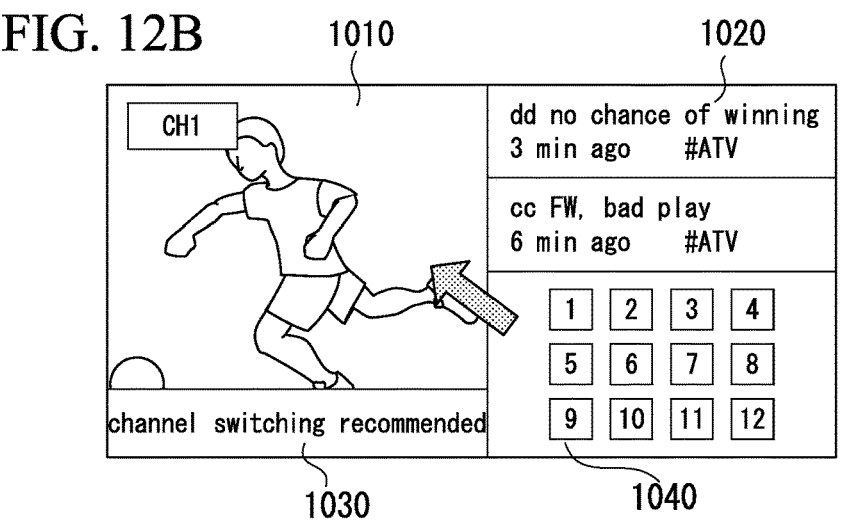
FIG. 12B is a diagram to show the above example of the information utilized to switch the content, similarly.
Figure 12C:
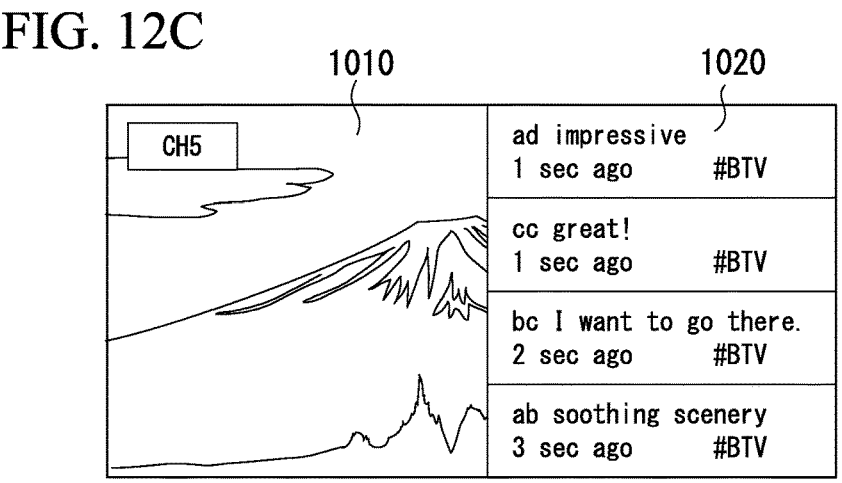
FIG. 12C is a diagram to show the above example of the information utilized to switch the content, similarly.

Next, referring to FIGS. 12A to 12C, another example of the information utilized to switch the content, which is displayed on the display part 112, will be explained. FIGS. 12A to 12C are diagrams to show the example of the information utilized to switch the content in the present embodiment.

As shown in FIG. 12A, the display part 112 displays a main content "CH1 program A" in the content display area 1010, and posted information, which was posted in association with the main content "CH1 program A", is displayed in the posted information display area 1020. In this posted information display area 1020, four posted information items which were posted 3, 6, 8, and 9 minutes ago from the current time are displayed in time series.

If the determination unit 128 (or the determination unit 443) determines that the switching condition is satisfied, the display part 112 displays (see FIG. 12B) (i) the switching message display area 1030 to display the information utilized to switch the content, under the content display area 1010, and (ii) a switching operation display area 1040 to display information utilized to switch the main content to a sub-content, under the posted information display area 1020.

In this switching operation display area 1040, a screen that includes operation display parts (GUIs) utilized to designate a content and command the content switching is displayed. For example, a screen that includes operation display parts (GUIs) for CH1 to CH12 (channels 1 to 12) is displayed.

When such an operation display part (GUI) displayed in the switching operation display area 1040 is touched or dragged up to the content display area 1010, the operation content determination unit 121 determines that an operation to command the switching to a designated content has been input. Here, it is assumed that the user has dragged the operation display part (GUI) for CH5 (channel 5) up to the content display area 1010 with touching this GUI.

Accordingly, as shown in FIG. 12C, the output control unit 122 switches the content displayed on the content display area 1010 from "CH1 program A" to "CH5 program E", that is, the main content is switched to a sub-content.

As described above, since the information (e.g., GUIs) utilized to switch to a sub-content is displayed, the user can easily perform the switching to another channel.

Figure 13A:
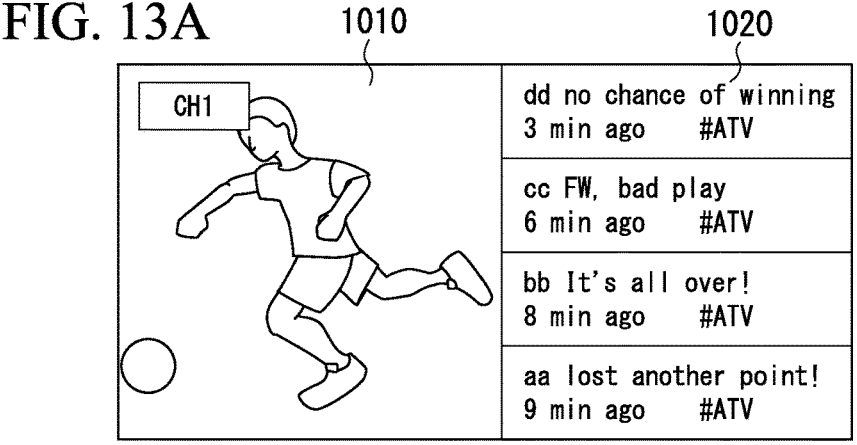
FIG. 13A is a diagram to show an example of the information utilized to switch the content pertaining to the embodiment of the present invention.
Figure 13B:
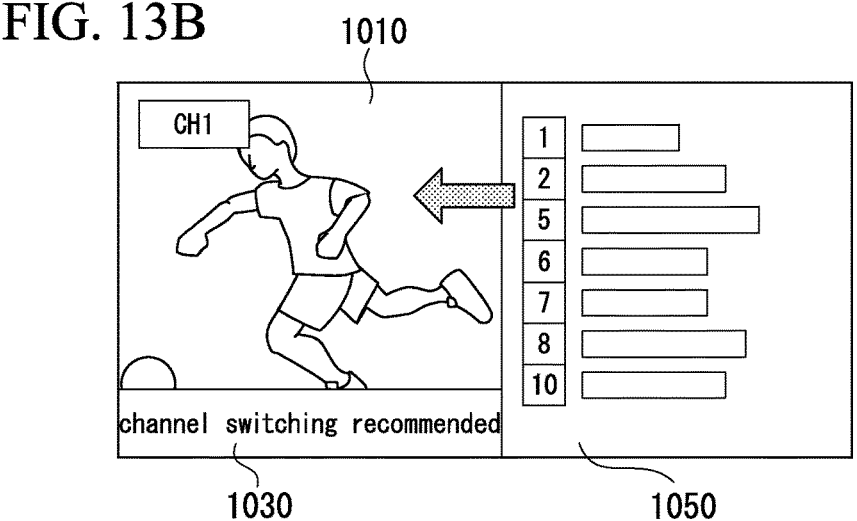
FIG. 13B is a diagram to show the above example of the information utilized to switch the content, similarly.
Figure 13C:
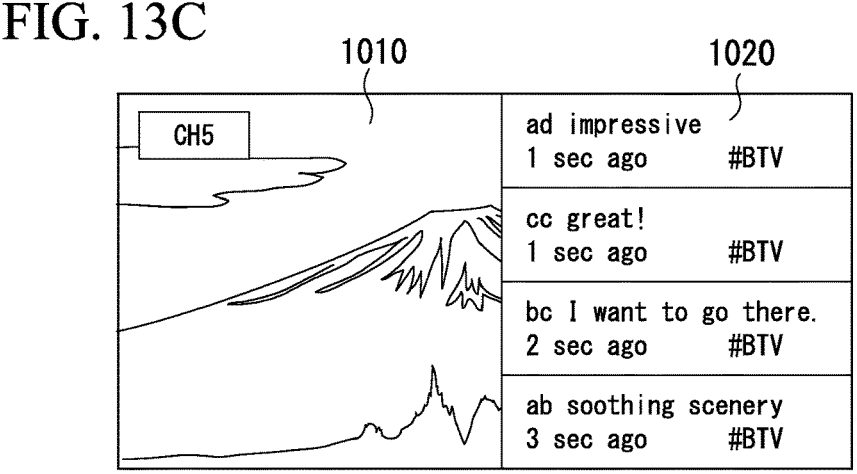
FIG. 13C is a diagram to show the above example of the information utilized to switch the content, similarly.

Next, referring to FIGS. 13A to 13C, another example of the information utilized to switch the content, which is displayed on the display part 112, will be explained. FIGS. 13A to 13C are diagrams to show the example of the information utilized to switch the content in the present embodiment.

As shown in FIG. 13A, the display part 112 displays a main content "CH1 program A" in the content display area 1010, and posted information, which was posted in association with the main content "CH1 program A", is displayed in the posted information display area 1020. In this posted information display area 1020, four posted information items which were posted 3, 6, 8, and 9 minutes ago from the current time are displayed in time series.

If the determination unit 128 (or the determination unit 443) determines that the switching condition is satisfied, the display part 112 displays (see FIG. 13B) (i) the switching message display area 1030 to display the information utilized to switch the content, under the content display area 1010, and (ii) a switching operation (estimated value) display area 1050, in place of the posted information display area 1020, to display information utilized to switch the main content to a sub-content and also estimated values.

In this switching operation (estimated value) display area 1050, a screen is displayed which includes (i) operation display parts (GUIs) utilized to designate a content and command the content switching and (ii) estimated values for the individual contents. For example, a screen utilizing a bar graph is displayed which shows operation display parts (GUIs) for CH1, CH2, CH5, CH6, CH7, CH8, and CH10 and the estimated values for the contents of these channels.

When such an operation display part (GUI) displayed in the switching operation (estimated value) display area 1050 is touched or dragged up to the content display area 1010, the operation content determination unit 121 determines that an operation to command the switching to a designated content has been input. Here, it is assumed that the user has dragged the operation display part (GUI) for CH5 (channel 5) up to the content display area 1010 with touching this GUT.

Accordingly, as shown in FIG. 13C, the output control unit 122 switches the content displayed on the content display area 1010 from "CH1 program A" to "CH5 program E", that is, the main content is switched to a sub-content.

As described above, since the information (e.g., GUIs) utilized to switch to a sub-content is displayed, the user can easily perform the switching to another channel. In addition, the estimated values of the individual contents are displayed. Therefore, for example, a content having the highest estimated value can be selected.

As described above, according to the display system of the present embodiment, in an information terminal that can simultaneously display video of a TV broadcast (e.g., One Seg) and posted information (mini-blog or the like) coupled with the video on display, the channel of the current viewing can be switched in accordance with the degree of activity for the posted information. The user can be invited to watch a currently trending program without performing any specific operation, that is, the user does not need to perform a specific retrieval or operation.

On the other hand, if not employing the present embodiment, then in order to search for a program more trending than the currently watched program of a TV broadcast (e.g., One Seg), the user needs to search the posted information or information on a message board, analyze popularity of currently broadcasted programs based on results of the search, and perform channel switching. Additionally, since such user's operations are performed when they come to the user's mind, a program, which has become a topic for posting, may have been terminated and the user may lose an opportunity to view this program.

In contrast, in the display system of the present embodiment, the currently watched program and the screen utilized to display the posted information for this program are simultaneously displayed so that the user can measure a degree of activity. Such video display and posted information display may be shown in divided areas on a single screen or may be shown utilizing a plurality of screens. Since the posted information display is updated continually, the user can determine whether or not the currently watched program is trending by confirming the updated degree of activity for the program.

As an example of confirming the degree of activity, a frequency of posting may be utilized. If the frequency of posting on a time line for the posted information is low, it can be determined that the degree of activity or popularity is low. In contrast, if the frequency of posting is high, it can be determined that there is a large number of viewers and the degree of popularity is high.

Accordingly, since video for a program and posted information for the program are displayed simultaneously, the degree of activity for the program can be confirmed, which can give an opportunity for channel switching to the user.

In the above-described structure in which the TV screen and the posted information screen are simultaneously displayed, a device for continuously monitoring the degree of activity for the posted information is provided so that the user can easily determine the degree of popularity for the currently watched program.

If measuring the degree of activity utilizing the frequency of posting, the number of posted information items per a unit time is continuously monitored.

In addition, a threshold for the degree of activity may be employed so as to determine the degree of popularity. If the degree of activity is greater than or equal to the threshold, it is determined that the degree of popularity is high and display of the currently watched program is maintained. If the degree of activity is less than the threshold, it is determined that the degree of popularity is low and a notice to recommend the switching from the currently watched program to another program is displayed on a screen. The user can more easily obtain an opportunity for the channel switching.

For the notice to recommend the switching to another program, a device that displays a message on a screen or a device that displays a UI (user interface) for channel selection together with or instead of such a message may be provided. When such an UI for channel selection is displayed, the channel switching can be more easily performed. In an information terminal having a display with a touch panel, channel switching is performed by tapping an GUI on the display, which indicates a channel, or dragging the GUI onto a TV video display area on the display.

In addition, a device that displays the degree of activity for each individual channel may be also provided on the UI for channel selection. As the degree of activity for each individual channel, results of monitoring, not only the currently watched program, but also programs on different channels. This process may be implemented utilizing a program loaded on an information processing apparatus (e.g., portable terminal) or a program loaded on a server that manages the posted information. Confirming the degree of activity also for the programs on different channels can help the channel selection by the user.

The above monitoring of the degree of activity for the current channel and other channels (sub-contents) may be performed continuously, instead of performed occasionally when it is determined that the degree of popularity for the currently watched program is low. If monitoring continuously, then in order to control the timing of displaying a notice to recommend the switching to another program based on a comparison between the degrees of activity of the currently watched program (main content) and programs on different channels, a device that can compare and display such degrees of activity is provided.

Accordingly, even when it is determined that the degree of activity for the currently watched program is low, if there is no other program having a degree of activity higher than that of the current program, it is possible to display no notice to recommend the switching to another program and thus to continue the display of the currently watched program. It is also possible to display no notice to recommend the switching to another program and to automatically switch to another program having the highest degree of activity among the programs on different channels. Whether or not such an automatic switching is performed may be determined utilizing a setup condition.

A known technique of automatically detecting a commercial during a TV program may be utilized to display the degree of activity for each sub-content when a commercial display is started. In this case, a notice to recommend the switching to another program can be presented without disrupting the user's program.

Therefore, the degree of popularity is determined based on results of measurement of the degree of activity for the currently watched program, and a notice is presented to the user if the degree of popularity is low. Accordingly, an opportunity of switching the currently watched program to another program can be provided to the user.

In addition, such switching to another program can be easily performed by displaying an UI for the channel selection when the notice is presented to the user.

Furthermore, when displaying the degree of activity for each sub-content together with the display of the notice for the user, it is possible to provide information useful for the user to determine which channel should be selected for the channel switching.

Additionally, since the degrees of activity also for the sub-contents are monitored continuously, it is possible to prevent the user from being given an opportunity of switching to another program even though there is no program whose degree of activity is higher than that of the currently watched program.

For the timing at which the relevant notice is provided for the user, a condition of "during a commercial" may be added to the condition pertaining to the degree of activity. Therefore, the opportunity of switching from the currently watched program to another program can be provided for the user without disturbing the user's program watching.

In addition, since the degrees of activity for the currently watched program and the sub-contents are provided during the TV broadcast watching, it is possible to prevent missing of a program having a high degree of popularity.

In the present embodiment, the operation part 111 and the display part 112 are included in the touch panel 101. However, the present invention is not limited to this form. In another example, the display part 112 is a display having no touch sensor, and the operation part 111 is an operation device such as a mouse, a keyboard, or buttons.

Additionally, the posted information includes information posted in a mini-blog, Twitter (registered trademark), or a blog.

The information processing system, the portable terminal 1, and the server 4, which pertain to the present embodiment, each include a computer system. The steps in the relevant operation are stored as a program in a computer-readable storage medium, and the operation is performed when the relevant computer loads and executes the program. The above computer system includes hardware resources such as a CPU, various types of memories, an OS, and peripheral devices.

If the computer system employs a WWW system, the computer system can provide a homepage service (or viewable) environment.

The above computer readable storage medium is a storage device, for example, a portable medium such as a flexible disk, a magneto optical disk, a ROM, a writable and non-volatile memory (e.g., flash memory), or a CD-ROM, or a memory device such as a hard disk built in a computer system.

The computer readable storage medium also includes a device for temporarily storing the program, such as a volatile storage medium (e.g., DRAM (dynamic random access memory)) in a computer system which functions as a server or client and receives the program via a network (e.g., the Internet) or a communication line (e.g., a telephone line).

The above program, stored in a memory device of a computer system, may be transmitted via a transmission medium or by using transmitted waves passing through a transmission medium to another computer system. The transmission medium for transmitting the program has a function of transmitting data, and is, for example, a (communication) network such as the Internet or a communication line such as a telephone line.

In addition, the program may execute a part of the above-described functions.

The program may also be a "differential file" (differential program) so that the above-described functions can be executed by a combination program of the differential program and an existing program which has already been stored in the relevant computer system.

Although all or part of the above-described embodiment can be described as follows, the present invention is not limited to the followings.

Supplement 1

A display system comprising:

a communication unit that receives currently delivered content data of contents which are each able to be output to an output unit;

an estimated value computation unit that computes an estimated value for evaluating a posting status of posted information that is posted on a Web page in association with the content;

a determination unit that determines, based on the estimated value, whether or not a switching condition for switching a main content among said contents, that is being output to the output unit, to a sub-content among said contents, that is not being output to the output unit, is satisfied; and an output control unit that controls, if it is determined that the switching condition is satisfied, the output unit to output information utilized to switch the content.

Supplement 2

The display system in accordance with Supplement 1, wherein:

the output control unit controls the output unit to output, as the information utilized to switch the content, information for switching to the sub-content whose estimated value is higher than that of the main content.

Supplement 3

The display system in accordance with Supplement 1 or 2, wherein:

when the estimated value for the main content is less than a predetermined threshold, the determination unit determines that the switching condition is satisfied.

Supplement 4

The display system in accordance with any one of Supplements 1 to 3, wherein:

when the estimated value for the main content is less than the estimated value for the sub-content, the determination unit determines that the switching condition is satisfied.

Supplement 5

The display system in accordance with any one of Supplements 1 to 4, wherein:

when it is determined that the switching condition is satisfied, the output control unit switches the content output to the output unit to the sub-content whose estimated value is higher than that of the main content.

Supplement 6

The display system in accordance with any one of Supplements 1 to 5, wherein:

the output control unit controls the output unit to output the estimated value computed by the estimated value computation unit.

Supplement 7

The display system in accordance with any one of Supplements 1 to 6, further comprising:

an operation unit that detects an operation input onto an operation image part that is output and displayed at the output unit, wherein the output control unit controls the output unit to output and display the operation image part for switching from the main content to the sub-content Supplement 8

The display system in accordance with any one of Supplements 1 to 7, wherein:

when it is determined that the switching condition is satisfied, the output control unit controls the output unit to output the information utilized to switch the content during a commercial time inserted into a main part of the main content.

Supplement 9

A display apparatus comprising:

a communication unit that receives currently delivered content data of contents which are each able to be output to an output unit;

an estimated value computation unit that computes an estimated value for evaluating a posting status of posted information that is posted on a Web page in association with the content;

a determination unit that determines, based on the estimated value, whether or not a switching condition for switching a main content among said contents, that is being output to the output unit, to a sub-content among said contents, that is not being output to the output unit, is satisfied; and an output control unit that controls, if it is determined that the switching condition is satisfied, the output unit to output information utilized to switch the content.

Supplement 10

A display method comprising:

a step that receives currently delivered content data of contents which are each able to be output to an output unit;

a step that computes an estimated value for evaluating a posting status of posted information that is posted on a Web page in association with the content;

a step that determines, based on the estimated value, whether or not a switching condition for switching a main content among said contents, that is being output to the output unit, to a sub-content among said contents, that is not being output to the output unit, is satisfied; and a step that controls, if it is determined that the switching condition is satisfied, the output unit to output information utilized to switch the content.

Supplement 11

A program that makes a computer function as:

a communication device that receives currently delivered content data of contents which are each able to be output to an output unit;

an estimated value computation device that computes an estimated value for evaluating a posting status of posted information that is posted on a Web page in association with the content;

a determination device that determines, based on the estimated value, whether or not a switching condition for switching a main content among said contents, that is being output to the output unit, to a sub-content among said contents, that is not being output to the output unit, is satisfied; and an output control device that controls, if it is determined that the switching condition is satisfied, the output unit to output information utilized to switch the content.

Priority is claimed on Japanese Patent Application No. 2012-52237, filed Mar. 8, 2012, the contents of which are incorporated herein by reference.

INDUSTRIAL APPLICABILITY

In accordance with the present invention, an appropriate timing for switching the content output to an output unit can be easily known.

REFERENCE SYMBOLS 1 portable terminal
2 radio communication network
2A base station
2B exchange
3 Internet
4 server
5 TV station
6 transmission antenna
7 storage medium
8 external device
101 touch panel
102 control unit
103 storage unit
104 antenna
105 TV broadcast receiving unit
106 communication unit 107 timer
111 operation part
112 display part
121 operation content determination unit
122 output control unit
123 broadcast data control unit
124 audio signal output unit
125 registration unit
126 posting unit
127 estimated value computation unit
128 determination unit
131 program storage area
132 temporary storage area
133 content storage area
134 posted information storage area
401 operation unit
402 communication unit
403 storage unit
404 control unit
405 time measuring unit
406 display unit
431 content broadcast information table
432 user attribute information table
433 posted information table
441 registration unit
442 estimated value computation unit
443 determination unit
444 retrieval unit
445 output control unit

The invention claimed is:

1. A display system, comprising:
a display device configured to concurrently display content data together with posted information associated with said content data posted by a person watching the main content;
a communication unit configured to receive the content data and the posted information from a content server, the content server having stored thereon a content table, a posting table related to the content table by way of a content identification, and a user attribute table which describes a poster's attribute having a poster identification relating to the posting table; and
a controller, coupled with a processor, a memory device, and a storage unit, the controller configured to control the display device to switch between a main content currently displayed on the display device and a sub-content selected from among a plurality of sub-contents that are broadcast concurrently with the main content and replaceable with the main content, with reference to the content table and the posting table installed in the content server,
wherein the display device is configured to display the main content or the sub-content while displaying the posted information relating to the main content or the sub-content in a time-based manner,
wherein the controller calculates a first estimation value representing an estimation of the posted information concerning the main content,
wherein the controller calculates a second estimation value representing an estimation of the posted information concerning the sub-content,
wherein the controller displays a content-switching message indicating a timing to switch from the main content to the sub-content that has a higher second estimation value among the plurality of sub-contents on the display device during an intermission time inserted into the main content, upon satisfying a switching condition concerning one of
i) a first condition where the first estimation value of the main content is smaller than a predetermined threshold,
ii) a second condition where the first estimation value of the main content is smaller than the predetermined threshold while the second estimation value of the sub-content is equal to or higher than the predetermined threshold,
iii) a third condition where the first estimation value of the main content is smaller than the second estimation value of the sub-content,
iv) a fourth condition where a time period satisfying at least one of the first to third conditions is longer than a predetermined time period, and
v) a fifth condition where at least one of the first to fourth conditions is satisfied during the intermission time for the main content being displayed on the display device,
and wherein the controller displays the content-switching message together with a switching operation display area for selecting the sub-content among the plurality of sub-contents.

2. A display control method adapted to a display system that has at least i) a display device configured to concurrently display content data together with posted information associated with said content data posted by a person watching the main content, ii) a communication unit configured to receive the content data and the posted information from a content server, the content server having stored thereon each of a content table, a posting table related to the content table by way of a content identification, and a user attribute table which describes a poster's attribute having a poster identification relating to the posting table, and iii) a controller configured to control the display device to switch between a main content currently displayed on the display device and a sub-content selected from among a plurality of sub-contents, which are broadcast concurrently with the main content and replaceable with the main content, with reference to the content table and the posting table installed in the content server, the display control method comprising:
calculating a first estimation value representing an estimation of the posted information concerning the main content;
calculating a second estimation value representing an estimation of the posted information concerning the sub-content;
displaying the main content or the sub-content on the display device while displaying the posted information relating to the main content or the sub-content in a time-base manner,
displaying a content-switching message indicating a timing to switch the main content to the sub-content having a higher second estimation value among the plurality of sub-contents on the display device during an intermission time inserted into the main content, upon satisfaction of a switching condition regarding one of
i) a first condition where the first estimation value of the main content is smaller than a predetermined threshold,
ii) a second condition where the first estimation value of the main content is smaller than the predetermined threshold while the second estimation value of the sub-content is equal to or higher than the predetermined threshold, iii) a third condition where the first estimation value of the main content is smaller than the second estimation value of the sub-content,
iv) a fourth condition where a time period satisfying at least one of the first to third conditions is longer than a predetermined time period, and
v) a fifth condition where at least one of the first to fourth conditions is satisfied during an intermission time for the main content being displayed on the display device,
and further displaying a switching operation display area for selecting the sub-content among the plurality of sub-contents.

3. A non-transitory computer-readable storage medium having stored thereon a program adapted to controlling i) a display system having a display device configured to concurrently display content data together with posted information associated with said content data posted by a person watching the main content, ii) a communication unit configured to receive the content data and said posted information from a content server having stored thereon a content table, a posting table related to the content table by way of a content identification, and a user attribute table which describes a poster's attribute having a poster identification relating to the posting table, and iii) a controller configured to control the display device to switch between a main content currently displayed on the display device and a sub-content selected from among a plurality of sub-contents, which are broadcast concurrently with the main content and replaceable with the main content, with reference to the content table and the posting table installed in the content server, the program, upon execution by the controller, causing the controller to implement the steps of the display control method according to claim 2.

4. The display system according to claim 1,
wherein the controller calculates the first estimation value by counting a number of the posted information or by assessing a degree of popularity with respect to the main content, and
wherein the controller calculates the second estimation value by counting a number of the posted information or by assessing a degree of popularity with respect to each of the plurality of sub-contents so as to recommend the sub-content having a higher second estimation value among the plurality of sub-contents.

5. The display control method according to claim 2, further comprising:
calculating the first estimation value by counting a number of the posted information or by assessing a degree of popularity with respect to the main content; and
calculating the second estimation value by counting a number of the posted information or by assessing a degree of popularity with respect to each of the plurality of sub-contents, thus recommending the sub-content having a higher second estimation value among the plurality of sub-contents.

6. The display system according to claim 1, wherein the switching operation display area includes a plurality of operators for selecting the plurality of sub-contents.

7. The display control method according to claim 2, wherein the switching operation display area includes a plurality of operators for selecting the plurality of sub-contents.

8. The display system according to claim 1, wherein the switching operation display area includes a plurality of operators for selecting the plurality of sub-contents, and a plurality of charts indicating the first estimation value of the main content and the second estimation value for each of the plurality of sub-contents.

9. The display control method according to claim 2, wherein the switching operation display area includes a plurality of operators for selecting the plurality of sub-contents, and a plurality of charts indicating the first estimation value of the main content and the second estimation value for each of the plurality of sub-contents.

10. The display system according to claim 1, wherein the switching operation display area includes display content of a comparison of the first estimation value of the main content and the second estimation value for each of the plurality of sub-contents.

11. The display control method according to claim 2, wherein the switching operation display area includes display content of a comparison of the first estimation value of the main content and the second estimation value for each of the plurality of sub-contents.

* * * * *